US012400456B2

(12) United States Patent
Takagi et al.

(10) Patent No.: US 12,400,456 B2
(45) Date of Patent: Aug. 26, 2025

(54) PERIPHERAL MONITORING DEVICE

(71) Applicant: TOYOTA JIDOSHA KABUSHIKI KAISHA, Toyota (JP)

(72) Inventors: Toshihiro Takagi, Nisshin (JP); Hiroshi Tanaka, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 183 days.

(21) Appl. No.: 18/082,015

(22) Filed: Dec. 15, 2022

(65) Prior Publication Data

US 2023/0252792 A1 Aug. 10, 2023

(30) Foreign Application Priority Data

Feb. 8, 2022 (JP) .................. 2022-018172

(51) Int. Cl.
*G06V 20/56* (2022.01)
*G06F 3/04883* (2022.01)
*G06F 3/14* (2006.01)
*G09G 5/36* (2006.01)

(52) U.S. Cl.
CPC .......... *G06V 20/56* (2022.01); *G06F 3/04883* (2013.01); *G06F 3/14* (2013.01); *G09G 5/36* (2013.01); *G09G 2380/10* (2013.01)

(58) Field of Classification Search
CPC ....... G06V 20/56; G06F 3/04883; G06F 3/14; G06F 3/04847; G09G 5/36; G09G 2380/10; B60R 1/22; B60R 16/023; B60R 2300/105; H04N 7/181
See application file for complete search history.

(56) References Cited

U.S. PATENT DOCUMENTS

| 2008/0071475 A1* | 3/2008 | Takaoka ............... G01C 21/20 701/469 |
| 2021/0076009 A1* | 3/2021 | Choi ................. G08B 13/19632 |
| 2021/0279959 A1* | 9/2021 | Watanabe ................ H04N 7/18 |
| 2023/0095245 A1* | 3/2023 | Peters ................... B60W 40/08 701/1 |

FOREIGN PATENT DOCUMENTS

| JP | 2005-291785 A | 10/2005 |
| JP | 2006-237974 A | 9/2006 |
| JP | 2008-26007 A | 2/2008 |
| JP | 2012-071833 A | 4/2012 |
| WO | 2014/020889 A1 | 2/2014 |
| WO | 2021/180433 A1 | 9/2021 |

OTHER PUBLICATIONS

Honda Navigation VXU-227VFNi Feb. 2022 Model.

* cited by examiner

*Primary Examiner* — Tat C Chio

(74) *Attorney, Agent, or Firm* — Sughrue Mion, PLLC

(57) ABSTRACT

A peripheral monitoring device includes: a photographing device that is configured to photograph a peripheral area of a vehicle; and a control unit that is configured to display a peripheral screen including a predetermined peripheral image generated based on an image photographed by the photographing device, when a predetermined display condition is established.

8 Claims, 9 Drawing Sheets

PERIPHERAL MONITORING DEVICE

CROSS-REFERENCE TO RELATED APPLICATION

This application claims priority to Japanese Patent Application No. 2022-018172 filed on Feb. 8, 2022, incorporated herein by reference in its entirety.

BACKGROUND

1. Technical Field

The present disclosure relates to a peripheral monitoring device in which a peripheral screen including a predetermined peripheral image is displayed on a display device mounted on a vehicle, when a predetermined display condition is established.

2. Description of Related Art

Conventionally, a peripheral monitoring device that displays a peripheral screen including a peripheral image on a display device is known. For example, a peripheral monitoring device (hereinafter referred to as a "conventional device") described in Japanese Unexamined Patent Application Publication No. 2012-71833 (JP 2012-71833 A) automatically displays a peripheral screen including an image of a range including a car body part that is most likely to be contacted when a vehicle is traveling on a narrow road or a narrow bend road.

SUMMARY

The present inventors, and the like are considering a peripheral monitoring device that automatically displays a peripheral screen when a vehicle is positioned near a "registration position stored in advance by a driver". Such a peripheral monitoring device needs to delete the registration position in accordance with an upper limit of a storage capacity of a storage device that stores the registration position or a request of the driver.

When the peripheral monitoring device deletes the registration position, the peripheral monitoring device causes the driver to select the registration position to be deleted. In this case, the peripheral monitoring device needs to display a screen in which the driver can identify which position is the registration position.

A peripheral monitoring device that displays a registration position on a map of map data using the map data stored by a navigation device mounted on a vehicle can be considered. However, there are the following problems.

- It is not able to be applied to a vehicle that does not have map data.
- When multiple registration positions exist at a relatively short distance, the driver must perform an enlargement operation to enlarge the map.

The present disclosure has been made to address the above-mentioned issues. That is, one of the objects of the present disclosure to provide a peripheral monitoring device that is applicable to a vehicle that does not have map data, and that can cause the driver to identify which position a registration position is without requiring an enlargement operation of the map.

The peripheral monitoring device of the present disclosure (hereinafter also referred to as "the device of the present disclosure") includes:

a photographing device (22FR, 22RR, 22L, 22R) that is configured to photograph a peripheral area of a vehicle; a control unit (20) that is configured to display on a display device (30) mounted on the vehicle, a peripheral screen including a predetermined peripheral image generated based on an image photographed by the photographing device, when a predetermined display condition is established, in which the control unit is configured to acquire the peripheral image generated based on the image photographed by the photographing device at a current position of the vehicle as a registration time image (step 715), when a driver of the vehicle performs a registration operation for registering the current position as a registration position (step 705 "Yes"), and store registration position information in which the registration time image and the current position are associated (step 725), display the peripheral screen on the display device (step 605 "Yes", step 630, step 640) by establishing the display condition (step 540) when a position condition that the vehicle is positioned within a predetermined first range (AR1) centered on the registration position is established (step 525 "Yes"), display on the display device, a selection screen (320) including a stored registration time image of the registration position information (step 730) when a predetermined delete condition is established (step 720 "No"), and delete registration position information of a registration time image selected by the driver on the selection screen (step 740).

The device of the present disclosure displays the selection screen including a registration time image, and deletes the registration position information of the registration time image selected by the driver on the selection screen. Thereby, the driver can identify which position the registration position of the registration position information is at by viewing the registration time image included in the selection screen. Accordingly, the device of the present disclosure can also be applied to a vehicle that does not have map data, and the device of the present disclosure can allow the driver to specify which position the registration position is at without the need for an enlargement operation of the map.

In one aspect of the device of the device of the present disclosure, the control unit is configured to end display of the peripheral screen (step 840) when the vehicle is positioned outside a second range set to a range wider than the first range centered on the registration position (step 835 "Yes"), in a case in which the peripheral screen is displayed on the display device due to the position condition being established (step 820 "Yes").

In the present aspect, display of the peripheral screen display is ended when the vehicle is positioned outside the "second range set to a range wider than the first range centered on the registration position", and not when the vehicle is positioned outside the first range. Thus, even when the identifying accuracy of the current position of the vehicle VA is poor, by having the current position of the vehicle being determined to be within the first range or being determined to be outside the first range, the possibility that display of the peripheral screen is repeatedly started and ended can be reduced. Therefore, it is possible to reduce the possibility that the driver feels that the repetition of the start and end of display of the peripheral screen is troublesome.

In one aspect of the device of the present disclosure, the control unit is configured to identify the current position of the vehicle based on a positioning signal received from a plurality of artificial positioning satellites (25), and end display of the peripheral screen (step 840) when a traveling distance in which the vehicle has traveled from a time point at which the current position of the vehicle is not able to be identified is equal to or more than a predetermined threshold value distance (step 850 "Yes"), in a case in which the current position of the vehicle is not able to be identified while the peripheral screen is displayed on the display device due to the position condition being established (step 825 "No").

In this embodiment, in a case in which the current position of the vehicle becomes un-identifiable, display of the peripheral screen ends when the traveling distance from the time point at which the current position of the vehicle can no longer be identified becomes equal to or more than the threshold value distance. Thereby, even when the current position of the vehicle is not able to be identified due to the inability to receive the positioning signal as a result of the vehicle being positioned in an underground parking lot or the like, display of the peripheral screen can be appropriately ended.

In one aspect of the device of the present disclosure, the control unit is configured to acquire as the peripheral image, at least one of an image (302) of a traveling direction of the vehicle and an overhead view image (304) of a peripheral area of the vehicle (step 615, step 715), and display on the display device, the peripheral screen that includes the peripheral image and display the selection screen (step 630, step 640, step 730).

Thereby, the driver can grasp the situation of at least one of the area of the traveling direction of the vehicle and the peripheral area of the vehicle by visually viewing the peripheral screen.

In one aspect of the device of the present disclosure, the control unit is configured to display the selection screen on the display device by establishing the delete condition (step 730), when the number of pieces of the stored registration position information is equal to or more than a predetermined threshold value (step 720 "No"), in a case in which the driver performs the registration operation (step 705, "Yes").

In this embodiment, when the number of stored (number of registrations of) registration position information is equal to or greater than the threshold value, the selection screen is displayed, and the driver is made to select the registration position information to be deleted. Thereby, it is possible to suppress the storage capacity of the registration position information from becoming too large.

In one aspect of the device of the present disclosure, the control unit is configured to display the peripheral screen on the display device by establishing the display condition, even when either an operation condition that the driver performs a request operation requesting display of the peripheral screen (step 520 "Yes") or an obstacle condition that an obstacle is detected in a vicinity of the vehicle is established (step 530 "Yes"), in addition to a case in which the position condition is established.

In this embodiment, since the peripheral screen is displayed when the operation condition is established, the peripheral screen can be displayed by performing the request operation when the driver wants the peripheral screen to be displayed. Furthermore, in this embodiment, since the peripheral screen is displayed when the obstacle condition is established, the peripheral screen can be displayed when there is an obstacle in the vicinity of the vehicle, and the possibility that the driver can recognize the obstacle can be increased.

In the above aspect, the display device is a touch screen style display device, and the control unit is configured to display a registration switch image (306) on the display device together with the peripheral image when the peripheral screen is displayed on the display device, and assume that the driver has performed the registration operation when the driver touches the registration switch image (step 705 "Yes"), acquire the registration time image, and store the registration position information (step 725).

In this embodiment, since the registration switch image is displayed together with the peripheral screen, it is possible to improve operability when the driver performs the registration operation.

In the above aspect, the control unit is configured to assume that the driver has performed the registration operation when the driver touches the registration switch image in a case in which a vehicle speed that is a speed of the vehicle is equal to or less than a predetermined threshold value vehicle speed (step 620 "Yes"), and not assume that the driver has performed the registration operation even when the driver touches the registration switch image in a case in which the vehicle speed is greater than the threshold value vehicle speed (step 620 "No").

Since it is assumed that the driver has performed the registration operation only when the driver touches the registration switch image in a case in which the vehicle speed is below the threshold value vehicle speed, the possibility that the driver tries to touch the registration switch image when the vehicle speed is greater than the threshold value vehicle speed can be reduced.

In the above description, in order to help understanding of the disclosure, the names and/or the reference symbols used in the embodiment are added in parentheses to the configurations of the disclosure corresponding to the embodiment to be described later. However, respective components of the disclosure are not limited to the embodiment defined by the above names and/or reference symbols. Other objects, other features and accompanying advantages of the present disclosure will be readily understood from the description of embodiments of the present disclosure described with reference to the following drawings.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Configuration

Figure 1:
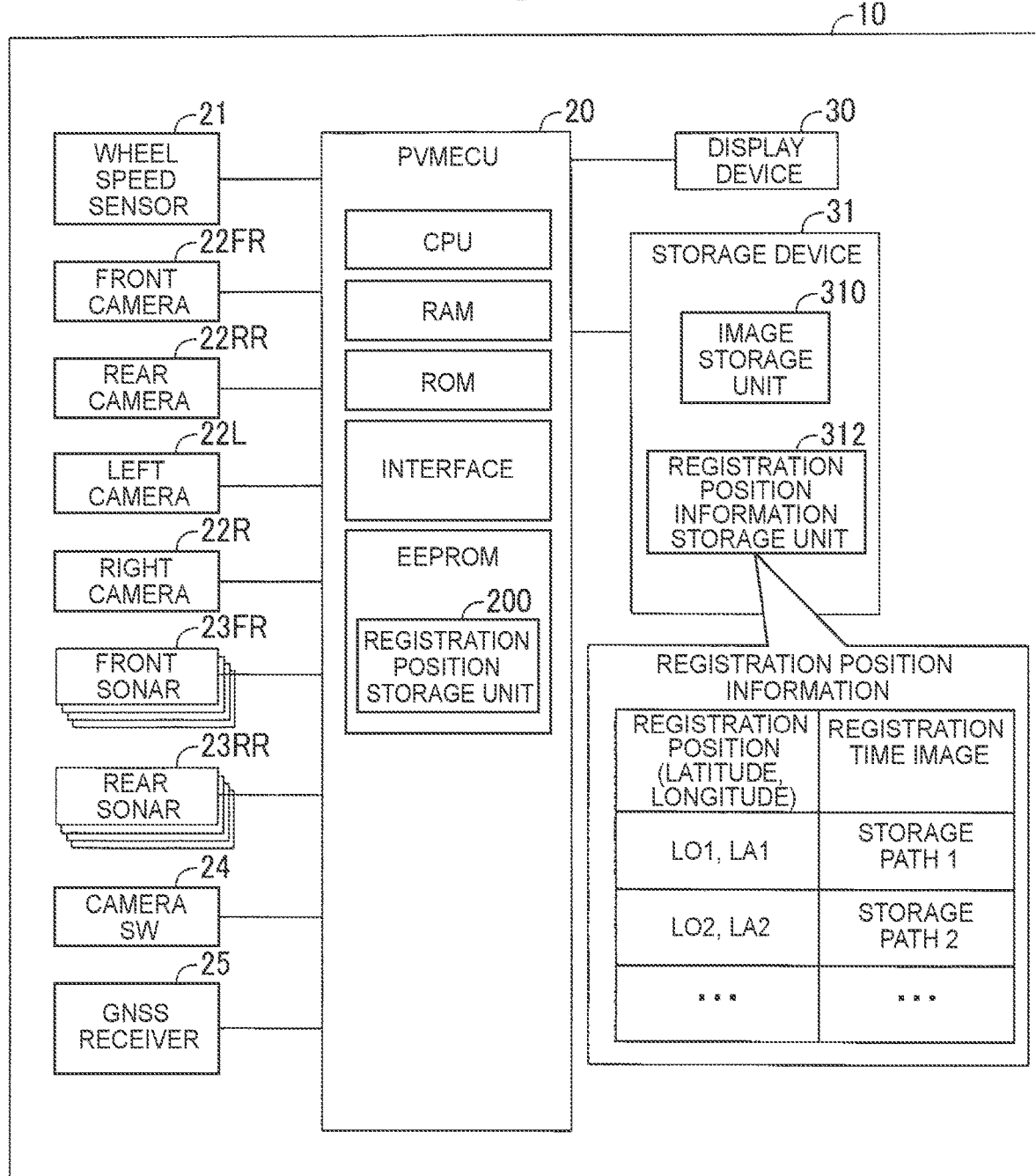
FIG. 1 is a schematic system configuration diagram of a peripheral monitoring device according to an embodiment of the present disclosure.

As shown in FIG. 1, a peripheral monitoring device 10 according to an embodiment of the present disclosure is mounted on a vehicle VA.

The peripheral monitoring device 10 includes a panoramic view monitor ECU 20 (hereinafter referred to as a "PVMECU 20").

The ECU is an abbreviation for an electronic control unit, and is an electronic control circuit having a microcomputer including a central processing unit (CPU), a read-only memory (ROM), a random access memory (RAM), an interface, and the like as a main component. The ECU may be referred to as a "control unit", a "controller" or a "computer". The CPU realizes various functions by executing instructions (routines, programs) stored in the memory (ROM). The functions of the ECU may be distributed across a plurality of ECUs.

The peripheral monitoring device 10 includes a wheel speed sensor 21, a front camera 22FR, a rear camera 22RR, a left camera 22L, a right camera 22R, four front sonars 23FR, four rear sonars 23RR, a camera switch (SW) 24, and a global navigation satellite system (GNSS) receiver 25. These are connected to the PVMECU 20 so as to be able to exchange data.

The wheel speed sensor 21 is provided for each wheel of the vehicle VA. Each wheel speed sensor 21 generates one wheel pulse signal each time the corresponding wheel rotates at a predetermined angle. The PVMECU 20 counts the number of pulses in the unit time of the wheel pulse signal generated by each wheel speed sensor 21, and acquires the rotational speed of each wheel based on the number of pulses. Then, the PVMECU 20 acquires a vehicle speed Vs that indicates the speed of the vehicle VA based on the rotational speed of each wheel. As an example, the PVMECU 20 acquires the average value of the wheel speed of the four wheels as the vehicle speed Vs.

The front camera 22FR is disposed near the center of a vehicle width direction of a front grille FG of the vehicle VA, for example. The front camera 22FR acquires a front image that is an image of the front area of the vehicle VA and transmits the front image to the PVMECU 20.

The rear camera 22RR is disposed, for example, near the center of the vehicle width direction of a back door (not shown) of the vehicle VA. The rear camera 22RR acquires a rear image that is an image of an area behind the vehicle VA and transmits the rear image to the PVMECU 20.

The left camera 22L is disposed in, for example, in a left side mirror LSM. The left camera 22L acquires a left side image that is an image of the area by photographing a left side area of the vehicle VA, and transmits the left side image to the PVMECU 20.

The right camera 22R is disposed in, for example, in a right side mirror RSM. The right camera 22R acquires a right side image that is an image of a right side area of the vehicle VA and transmits the right side image to the PVMECU 20.

When the images taken by the cameras 22FR to 22R are combined, it becomes an image of the area around the vehicle VA (360 degrees).

The four front sonars 23FR are located at the left end, left center, right center, and right end of the front bumper FB of the vehicle VA, respectively.

The front sonar 23FR emits sound waves and receives sound waves reflected by a three-dimensional object (hereinafter sometimes referred to as an "obstacle"). Based on the received sound wave, the front sonar 23FR acquires a distance from the vehicle VA to the three-dimensional object and a horizontal position of the three-dimensional object with respect to the vehicle VA as forward three-dimensional object information, and transmits the forward three-dimensional object information to the PVMECU 20.

The PVMECU 20 can detect a three-dimensional object present in the area from the left front side to the right front side of the vehicle VA based on the front three-dimensional information received from each front sonar FR 23.

The four rear sonars 23RR are disposed at the left end, left center, right center, and right end of the rear bumper (not shown) of the vehicle VA, respectively.

The rear sonar 23RR emits a sound wave, receives the sound wave reflected by the three-dimensional object, acquires the distance to the three-dimensional object and the horizontal position of the three-dimensional object based on the received sound wave as back-solid-object information, and transmits the rear three-dimensional object information to the PVMECU 20.

The PVMECU 20 can detect a three-dimensional object present in the area from the left rear side to the right rear side of the vehicle VA based on the rear three-dimensional information received from each rear sonar 23RR.

A camera SW 24 is disposed at a position near a steering wheel (not shown) of the vehicle VA and where the driver of the vehicle VA can operate the camera 24. When the driver operates the camera SW 24, the PVMECU 20 displays a front mode screen 300 shown in FIGS. 2A to 2D on a display device 30. The front mode screen 300 may be referred to as a "peripheral screen".

The GNSS receiver 25 is a device for receiving positioning signals transmitted from a plurality of artificial positioning satellites. The PVMECU 20 identifies the current position (latitude and longitude) of the vehicle VA based on the positioning signals received by the GNSS receiver 25.

Further, the peripheral monitoring device 10 includes the display device 30 and a storage device 31. These are connected to the PVMECU 20 so as to able to exchange data.

The display device 30 is disposed in a position where the driver can see in the vehicle cabin of the vehicle VA, and is a touch screen style display in which the driver can perform input by touching the screen displayed on the display device 30. For example, the display device 30 is a multimedia display provided near the center of an instrument panel of the vehicle VA.

A storage device 26 is a non-volatile storage device in which the PVMECU 20 can read and write data. For example, the storage device 26 is a hard disk drive, but is not limited to a hard disk drive, and may be a well-known storage device or storage medium in which the PVMECU 20 can read and write data.

The storage device 26 includes an image storage unit 310 and a registration position information storage unit 312. The image storage unit 310 stores a registration time image described later. The registration position information storage unit 312 stores the registration position information in which the registration position and the registration time image, which will be described later, are associated.

Outline of Operation

Figure 2:
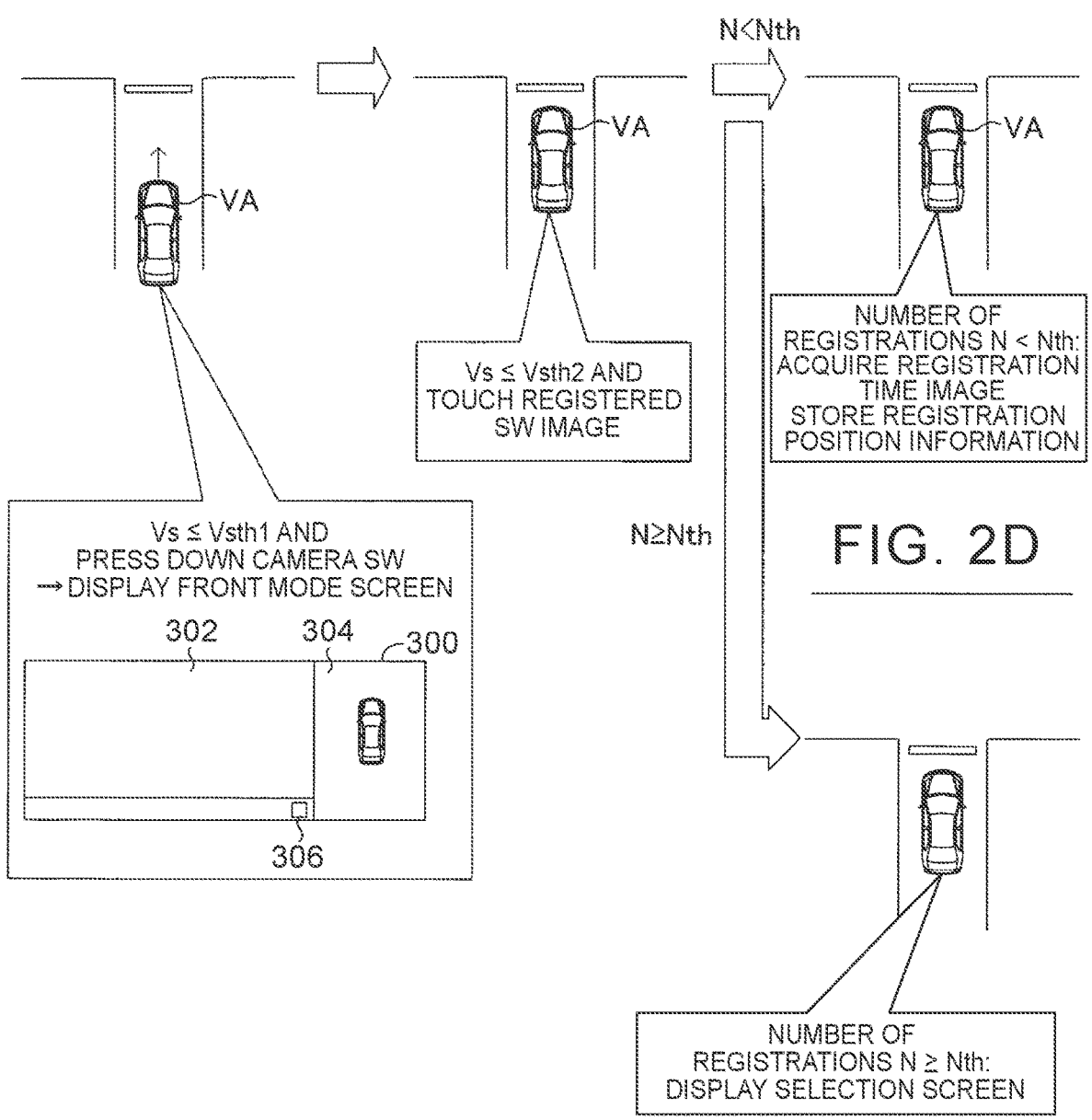
FIG. 2A is an explanatory diagram of an outline of an operation of the peripheral monitoring device according to the embodiment of the present disclosure.
FIG. 2B is an explanatory diagram of an outline of an operation of the peripheral monitoring device according to the embodiment of the present disclosure.
FIG. 2C is an explanatory diagram of an outline of an operation of the peripheral monitoring device according to the embodiment of the present disclosure.
FIG. 2D is an explanatory diagram of an outline of an operation of the peripheral monitoring device according to the embodiment of the present disclosure.
Figure 3:
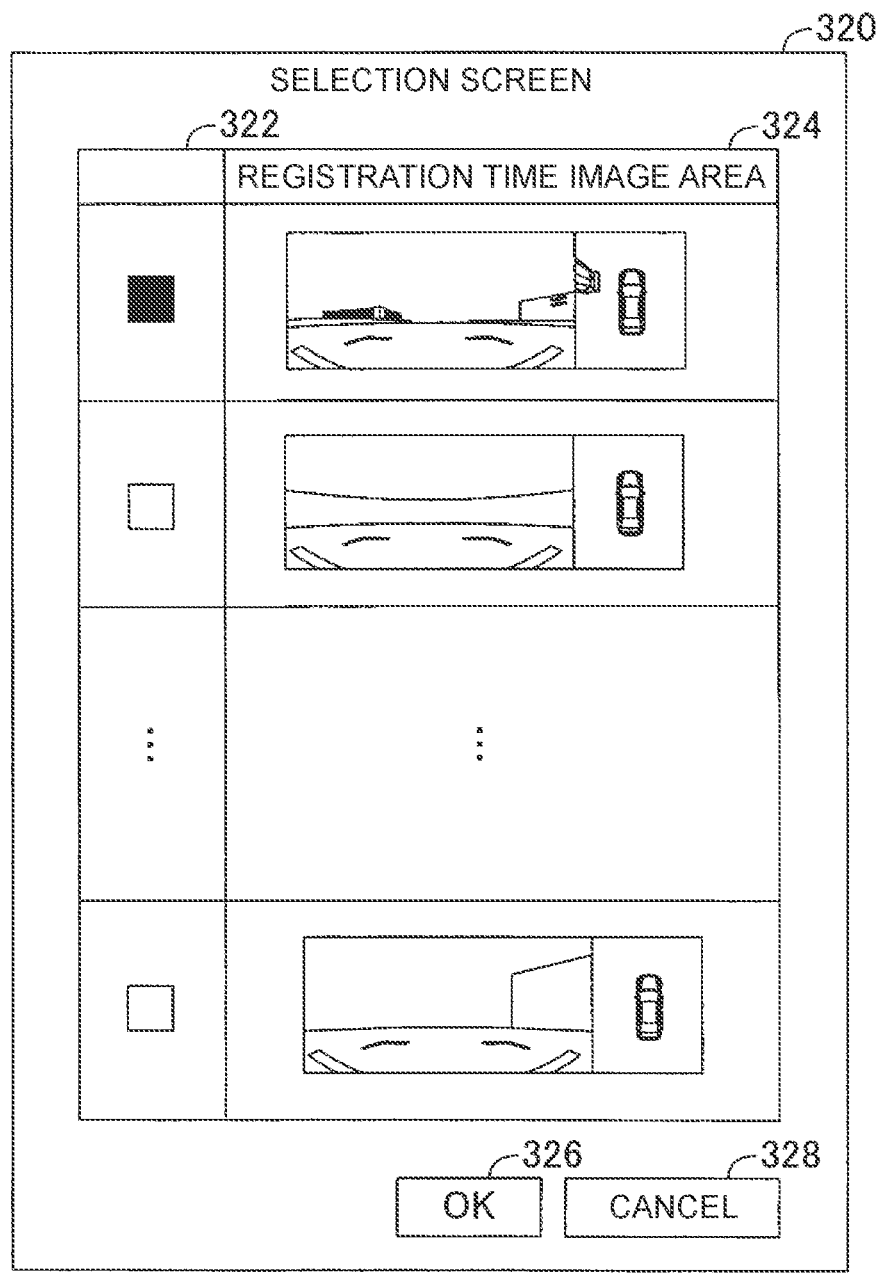
FIG. 3 is an explanatory diagram of a selection screen displayed in a display device shown in FIG. 1.

With reference to FIGS. 2 and 3, an outline of the operation of the peripheral monitoring device 10 will be described.

As shown in FIG. 2A, when the vehicle VA enters a T-shaped road, the driver operates the camera SW 24 because the visibility is poor on this T-shaped road, and wants to check the situation on the left and right sides of the T-shaped road. When the camera SW 24 is operated and the vehicle speed Vs is equal to or less than a first threshold value vehicle speed Vsth1, the peripheral monitoring device 10 displays the front mode screen 300 on the display device 30.

The front mode screen 300 includes a traveling direction image area 302, a panoramic view (PV) image area 304, and a registration switch (SW) image 306. The traveling direction image area 302 displays a traveling direction image generated based on the front image acquired by the front camera 22FR.

The PV image area 304 displays a PV image generated based on a front image, a rear image, a left side image, and a right side image. The PV image is a bird's-eye view when the peripheral area of the vehicle VA is viewed from a vertical upward viewpoint of the vehicle VA.

The registration SW image 306 is an image to be touched when the driver registers the current position as a registration position. When the vehicle speed Vs is less than or equal to "a second threshold value vehicle speed vsth that is smaller than the first threshold value vehicle speed Vsth1" and the driver touches the registration SW image 306, the peripheral monitoring device 10 regards this touch operation as a registration operation and registers the current position of the vehicle VA as the registration position.

Thereafter, as shown in FIG. 2B, the vehicle VA stops before the stop line (that is, the vehicle speed Vs is the second threshold value vehicle speed Vsth2 or less). The driver desires that the front mode screen 300 be displayed when the vehicle VA passes through this T-shaped road in the future, and touches the registration SW image 306.

When the vehicle speed Vs is less than or equal to the second threshold value vehicle speed Vsth2 and the driver touches the registration SW image 306, the peripheral monitoring device 10 determines whether the number N of registration position information stored in the registration position information storage unit 312 (hereinafter referred to as the "number of registrations") is less than a threshold Nth.

When the number of registrations N is less than the threshold value Nth, as shown in FIG. 2C, the peripheral monitoring device 10 acquires a front image, a rear image, a left side image, and a right side image, generates a PV image based on these images and generates a traveling direction image based on the front image, and stores the traveling direction image and the PV image in the image storage unit 310 as the registration time image. Furthermore, in this case, the peripheral monitoring device 10 stores in the registration position information storage unit 312, the registration position information in which the current position of the vehicle VA and the registration time image are associated. Specifically, the peripheral monitoring device 10 stores in the registration position information storage unit 312, the registration position information in which the current position of the vehicle VA and a "storage path representing a place where the registration time image is stored" are associated.

On the other hand, when the number of registrations N is the threshold value Nth or more, as shown in FIG. 2D, the peripheral monitoring device 10 displays a selection screen 320 shown in FIG. 3. The selection screen 320 is a screen for allowing the driver to select the registration position information to be deleted.

The selection screen 320 will be described with reference to FIG. 3.

On the selection screen 320, the registration time image of the registration position information stored in the registration position information storage unit 312 is displayed. The selection screen 320 includes a checkbox area 322, a registration time image area 324, an OK image 326, and a cancellation image 328.

In the checkbox area 322, a checkbox image corresponding to each registration time image is displayed. When a registration time image is not selected, the checkbox image corresponding to the registration time image is white, and when the registration time image is selected, the checkbox image corresponding to the registration time image changes to black. In the registration time image area 324, the registration time images (traveling direction image and PV image) are displayed.

When the OK image 326 is touched in a state in which at least one registration time image selected, the peripheral monitoring device 10 deletes the registration position information of the selected registration time image from the registration position information storage unit 312 and deletes the registration position information of the registration time image that is selected from the image storage unit 310. Then, the peripheral monitoring device 10 stores in the registration position information storage unit 312, the registration position information in which the current position of the vehicle VA and the newly acquired registration time image are associated, and stores the registration time image in the image storage unit 310.

When the cancellation image 328 is touched in a state in which at least one registration time image is selected, the peripheral monitoring device 10 cancels the selection. Furthermore, when the cancellation image 328 is touched in a state in which none of the registration time images are selected, the peripheral monitoring device 10 cancels storing the new registration position information.

The peripheral monitoring device 10 according to the present embodiment displays the selection screen 320 including the registration time image of the registration position information stored in the registration position information storage unit 312. Thereby, since the driver can easily identify which position the registration position information is, unnecessary registration position information can be deleted.

The peripheral monitoring device that displays the registration position information of the registration position information on the map in order to allow the driver to select the registration position information to be deleted cannot be applied to the vehicle VA that does not have the map data. On the other hand, since the peripheral monitoring device 10 according to the present embodiment should store the registration time image when storing (registering) the registration position information, it can be applied to the vehicle VA that does not have the map data. Furthermore, according to the peripheral monitoring device 10 according to the present embodiment, even when a plurality of registration positions exist at a relatively short distance, the driver can identify the position at which the registration position is by viewing the registration time image and thus, an enlargement operation of the map is unnecessary.

Display Condition

When the display condition is established, the peripheral monitoring device 10 starts display on the display device 30 of the front mode screen 300.

The display condition is established when any of the following operation condition, obstacle condition, and position condition are established, in a case in which the vehicle speed Vs is equal to or less than the first threshold value vehicle speed Vsth1 and a shift position SP is a position other than a parking (P) position and a reverse (R) position.

Operation condition: The camera SW 24 is operated.
Obstacle condition: At least one of the front sonar 23FR and the rear sonar 23RR has detected a three-dimensional object (obstacle).
Position condition: The vehicle VA is positioned in a predetermined first range AR1 from the registration position of the registration position information (see FIG. 4).

Figure 4:
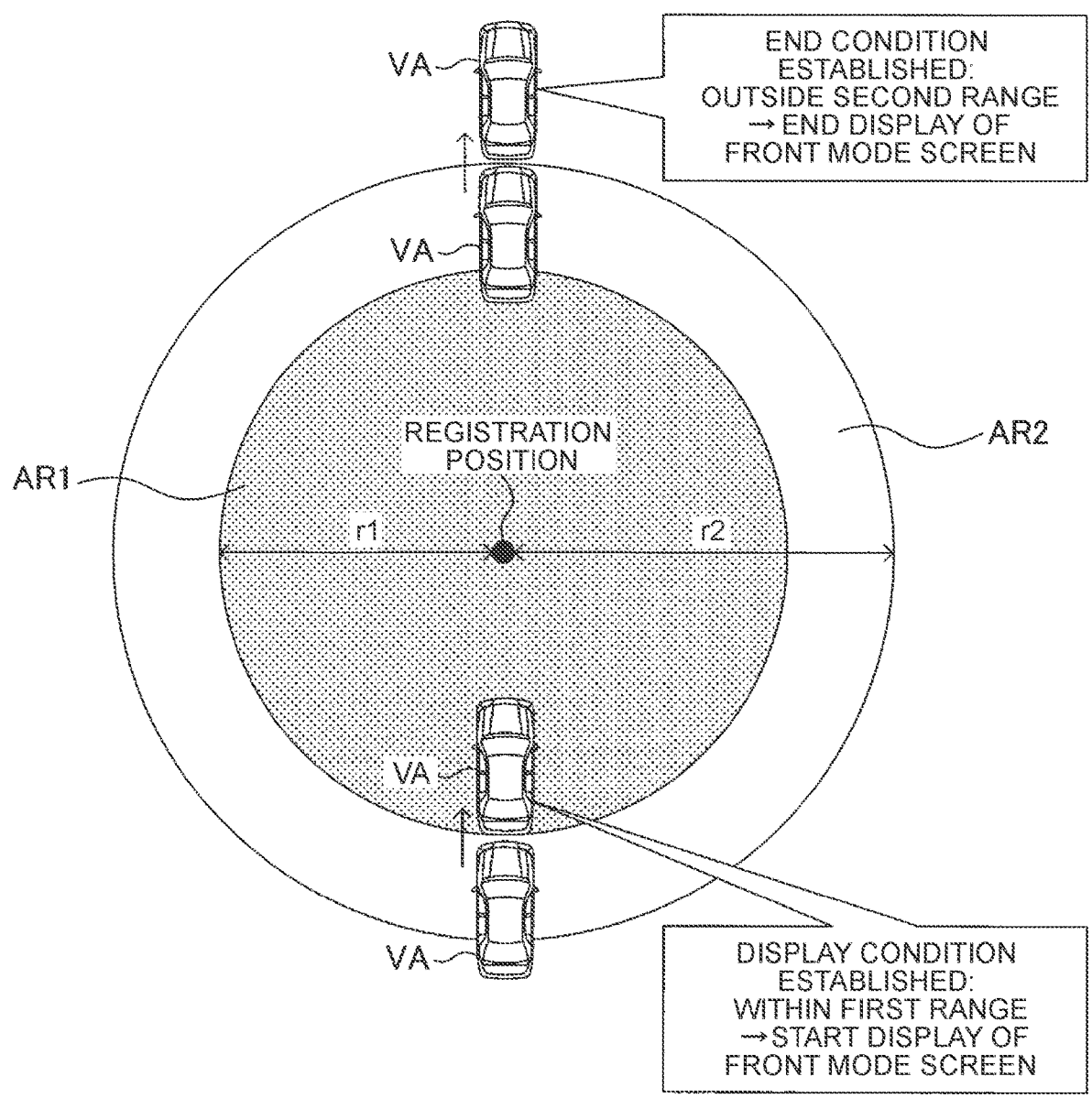
FIG. 4 is an explanatory diagram of a first range and a second range.

As shown in FIG. 4, for example, the first range AR1 is a circular shape having a predetermined radius r1 centered on the registration position.

End Conditions

When the end conditions are established, the peripheral monitoring device 10 ends the display on the display device 30 of the front mode screen 300, and displays on the display device 30, the screen that was displayed on the display device 30 before the front mode screen 300 was displayed.

The end condition is established when the following condition 1 is established.
Condition 1: The vehicle speed Vs is greater than the first threshold value vehicle speed Vsth1.

Furthermore, when the display condition is established because the obstacle condition is established, the end condition is established when the following condition 2 is established even if condition 1 is not established.
Condition 2: Neither the front sonar 23FR nor the rear sonar 23RR detects a three-dimensional object.

Furthermore, when the display condition is established because the position condition is established, the end condition is established when any of the following conditions 3 and 4 are established even if condition 1 is not established.
Condition 3: The vehicle VA is positioned outside a second range AR2 shown in FIG. 4.

As shown in FIG. 4, for example, the second range AR2 is a circular shape having a predetermined radius r2 centered on the registration position. The radius r2 is longer than the radius r1. For this reason, the second range AR2 has a wider range than the first range AR1.

If the display of the front mode screen 300 ends when the condition that the vehicle VA is positioned outside the first range AR1 is established, even when the specific accuracy of the current position of the vehicle VA is poor, the current position of the vehicle is determined to be within the first range or is determined to be outside the first range. Due to this, the start and end of the display of the front mode screen 300 are repeated, and the driver may feel that it is troublesome. In the present embodiment, since the second range AR2 is set to be wider than the first range AR1, the possibility that the start and end of the display of the front mode screen 300 is repeated is reduced, and the possibility that the driver feels troublesome can be reduced.

Condition 4: When the GNSS receiver 25 can no longer receive the positioning signals (that is, when the current position of the vehicle VA can no longer be identified), a distance D traveled by the vehicle VA from the time when the positioning signals could not be received (traveling-distance-while-lost) is equal to or greater than a threshold value distance Dth.

If the display of the front mode screen 300 ends when the condition that the GNSS receiver 25 can no longer receive the positioning signal is established, the display of the front mode screen 300 ends even though the driver wants to see the front mode screen 300, and there is a possibility that the driver feels troublesome. According to the present embodiment, even when the GNSS receiver 25 can no longer receive the positioning signal, if the vehicle VA does not travel for the threshold value distance Dth or more, the display of the front mode screen 300 does not end. If the vehicle VA is traveling for the threshold value distance Dth or more, it is likely that the need for the driver to see the front mode screen 300 has already been lost. For this reason, the possibility that the driver feels troublesome as described above can be reduced.

Specific Operation

Display Condition Determination Routine

The CPU of the PVMECU 20 (hereinafter, "CPU" in the description refers to the CPU of the PVMECU 20 unless otherwise specified) executes a display condition determination routine shown by the flowchart in FIG. 5 every time a predetermined time elapses.

Figure 5:
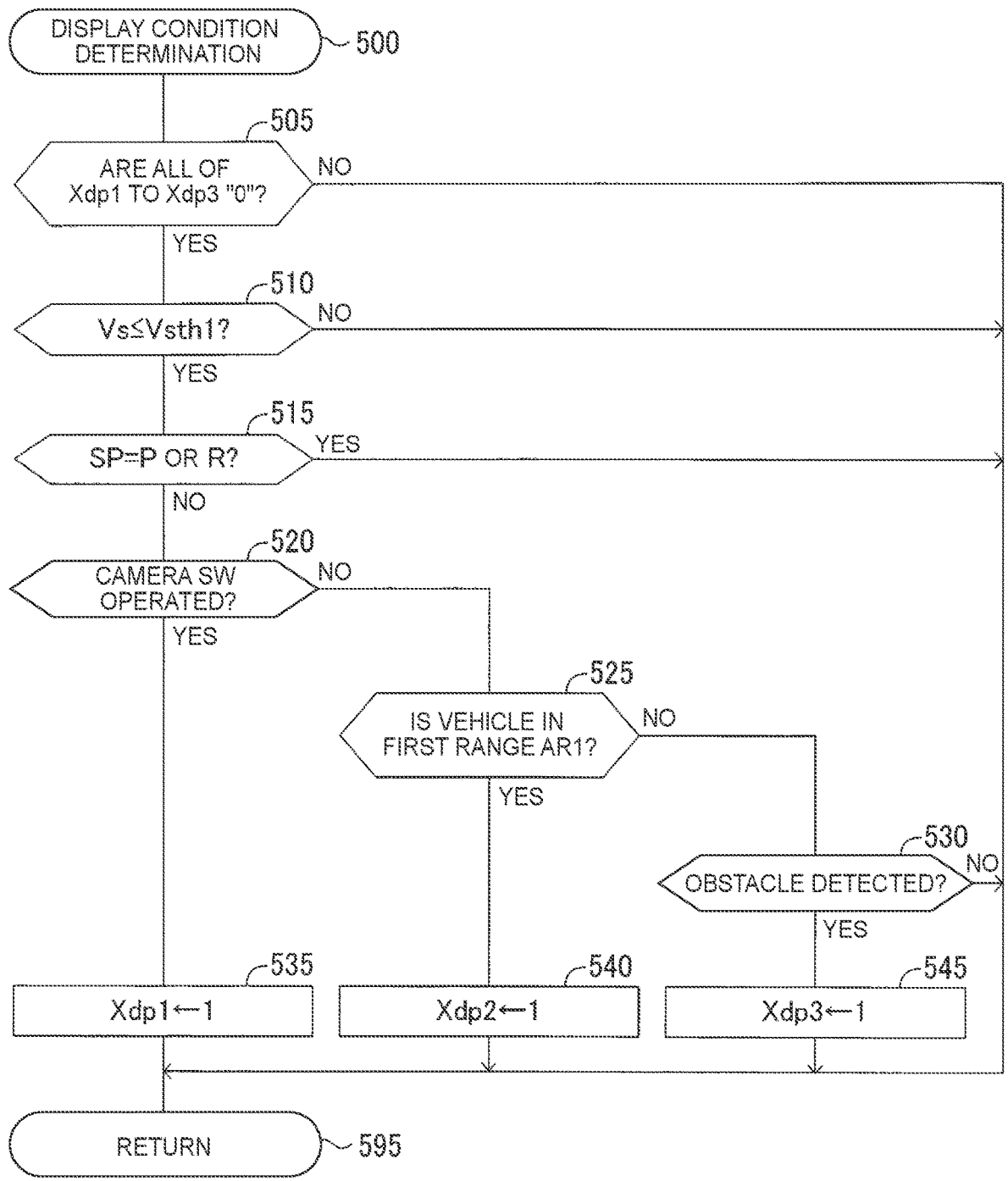
FIG. 5 is a flowchart showing a display condition determination routine executed by a PVMECU CPU shown in FIG. 1.

Therefore, at a predetermined timing, the CPU starts the process from step 500 shown in FIG. 5 and proceeds to step 505. In step 505, the CPU determines whether values of a first display flag Xdp1, a second display flag Xdp2, and a third display flag Xdp3 are The value of the first display flag Xdp1 is set to "1" when the display condition is established due to the establishment of the above operation condition, and is set to "0" when the above end condition is established. The CPU sets the value of the first display flag Xdp1 to "0" in an initial routine executed when an ignition key switch (not shown) of the vehicle VA is changed from an off position to an on position.

The value of the second display flag Xdp2 is set to "1" when the display condition is established due to the establishment of the above position condition, and is set to "0" when the above end condition is established. The CPU sets the value of the second display flag Xdp2 to "0" in the initial routine.

The value of the third display flag Xdp3 is set to "1" when the display condition is established due to the establishment of the above obstacle condition, and is set to "0" when the above end condition is established. The CPU sets the value of the third display flag Xdp3 to "0" in the initial routine.

When the values of the first display flag Xdp1, the second display flag Xdp2, and the third display flag Xdp3 are "0", the CPU determines "Yes" in step 505 and proceeds to step 510.

In step 510, the CPU determines whether the vehicle speed Vs is equal to or less than the first threshold value vehicle speed Vsth1. When the vehicle speed Vs is greater than the first threshold value vehicle speed Vsth1, the CPU determines "No" in step 510 and proceeds to step 595 to temporarily end this routine.

When the vehicle speed Vs is equal to or less than the first threshold value vehicle speed Vsth1, the CPU determines "Yes" in step 510 and proceeds to step 515. In step 515, the CPU determines whether the shift position SP is either the P position or the R position.

When the shift position SP is either the P position or the R position, the CPU determines "Yes" in step 515 and proceeds to step 595 to temporarily end this routine.

When the shift position SP is neither the P position nor the R position, the CPU determines "No" in step 515 and proceeds to step 520. In step 520, the CPU determines whether the camera SW 24 has been operated.

When the camera SW 24 has not been operated, the CPU determines "No" in step 520 and proceeds to step 525. In step 525, the CPU determines whether the vehicle VA is positioned in the first range AR1.

When the vehicle VA is not located in the first range AR1, the CPU determines "No" in step 525 and proceeds to step 530. In step 530, the CPU determines whether at least one of the front sonar 23FR and the rear sonar 23RR detects an obstacle based on the front three-dimensional object information and the rear three-dimensional object information.

When neither the front sonar 23FR nor the rear sonar 23RR detect an obstacle, the CPU determines "No" in step 530 and proceeds to step 595 to temporarily end this routine.

On the other hand, when the camera SW 24 is operated when the CPU proceeds to step 520, the CPU determines "Yes" in step 520 and proceeds to step 535. In this case, since the display condition is established because the operation condition is established, in step 535, the CPU sets the value of the first display flag Xdp1 to "1", and proceeds to step 595 to temporarily end this routine.

On the other hand, when the vehicle VA is positioned in the first range AR1 when the CPU proceeds to step 525, the CPU determines "Yes" in step 525 and proceeds to step 540. In this case, since the display condition is established because the position condition is established, in step 540, the CPU sets the value of the second display flag Xdp2 to "1", proceeds to step 595 and temporarily ends this routine.

On the other hand, when at least one of the front sonar 23FR and the rear sonar 23RR detects an obstacle when the CPU proceeds to step 530, the CPU determines "Yes" in step 530 and proceeds to step 545. In this case, since the display condition is established because the obstacle condition is established, in step 545, the CPU sets the value of the third display flag Xdp3 to "1", and proceeds to step 595 to temporarily end this routine.

On the other hand, when the CPU proceeds to step 505, when the value of any of the first display flag Xdp1, the second display flag Xdp2, and the third display flag Xdp3 is "1", the CPU determines "No" in step 505 and proceeds to step 595 to temporarily end this routine.

Display Control Routine

Figure 6:
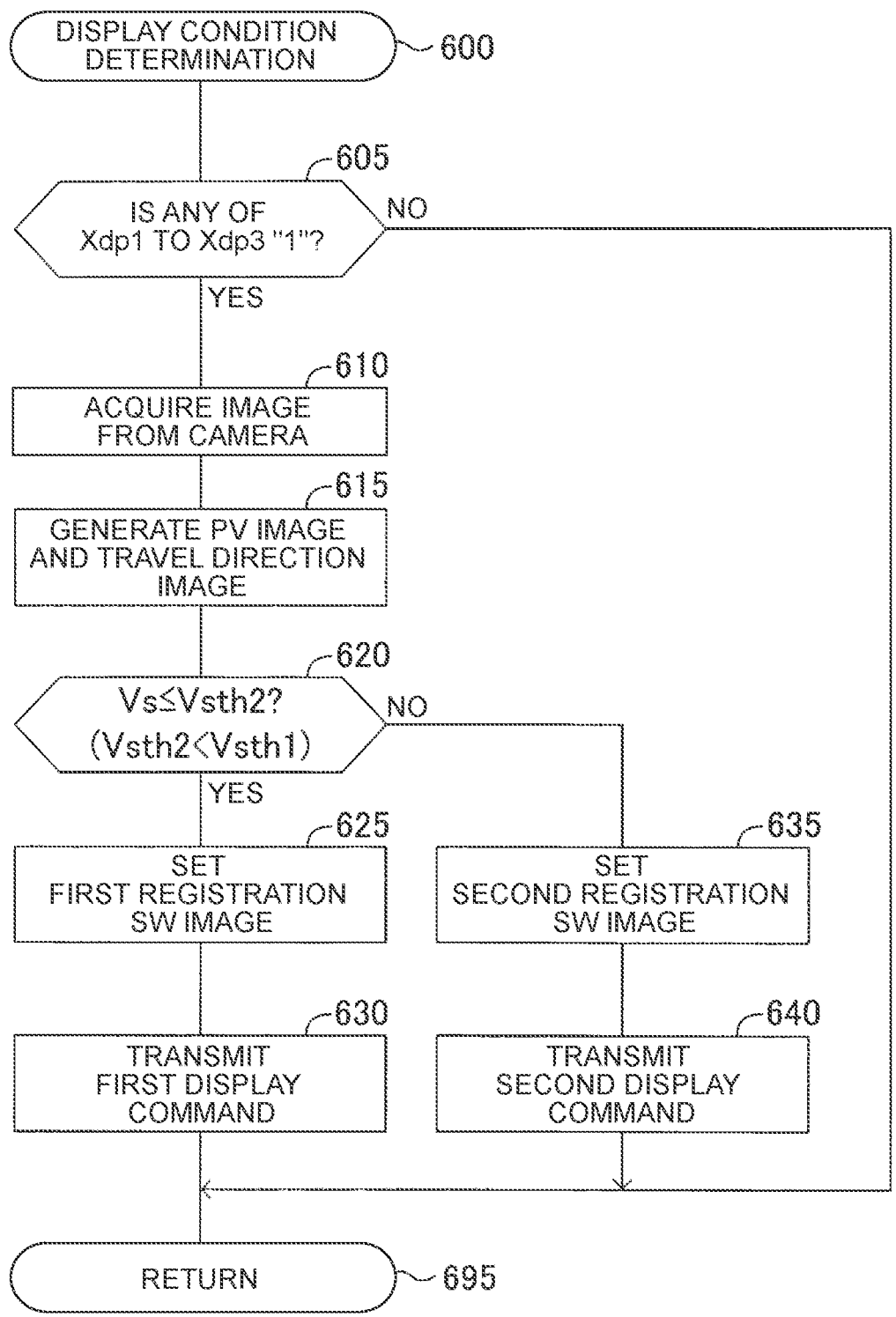
FIG. 6 shows a flowchart of a display control routine executed by the PVMECU CPU shown in FIG. 1.

The CPU executes a display control routine shown by the flowchart in FIG. 6 every time a predetermined time elapses.

Therefore, at a predetermined timing, the CPU starts the process from step 600 shown in FIG. 6 and proceeds to step 605. In step 605, the CPU determines whether values of a first display flag Xdp1, a second display flag Xdp2, and a third display flag Xdp3 are When the values of the first display flag Xdp1, the second display flag Xdp2, and the third display flag Xdp3 are all "0", the CPU determines "No" in step 605, and the procedure proceeds to step 695 and temporarily ends this routine.

When the value of any of the first display flag Xdp1, the second display flag Xdp2, and the third display flag Xdp3 is "1", the CPU determines "Yes" in step 605, and steps 610 to 620 are executed in order.

Step 610: The CPU acquires a front image, a rear image, a left side image, and a right side image from each of the cameras 22FR to 22R.

Step 615: The CPU generates the PV image based on the front image, the rear image, the left side image and the right side image, and generates the traveling direction image based on the front image.

Step 620: The CPU determines whether the vehicle speed Vs is equal to or less than the second threshold value vehicle speed Vsth2.

When the vehicle speed Vs is the second threshold value vehicle speed Vsth2 or less, the CPU determines "Yes" in step 620 and executes step 625 and step 630 in order.

Step 625: The CPU sets the first registration SW image as the registration SW image 306.

Step 630: The CPU transmits a first display command including the traveling direction image, the PV image, and the first registration SW image to the display device 30.

After that, the CPU proceeds to step 695 and temporarily ends this routine.

When the display device 30 receives the first display command, it displays the front mode screen 300 including the traveling direction image, the PV image, and the first registration SW image included in the first display command. When the first registration SW image is touched, the display device 30 transmits touch information indicating that the registration SW image 306 has been touched to the PVMECU 20.

On the other hand, when the vehicle speed Vs is larger than the second threshold value vehicle speed Vsth2, the CPU determines "No" in step 620 and executes step 635 and step 640 in order.

Step 635: The CPU sets the second registration SW image as the registration SW image 306. It is desirable that the second registration SW image is an image of the registered SW in such a manner that it is less conspicuous than the first registration SW image. For example, the first registration SW image is a solid line, while the second registration SW image is a dotted line. The color of the second registration SW image may be a color closer to the background color of the front mode screen 300 than the color of the first registration SW image.

Step 640: The CPU transmits a second display command including the traveling direction image, the PV image, and the second registration SW image.

After that, the CPU proceeds to step 695 and temporarily ends this routine.

When the display device 30 receives the second display command, it displays the front mode screen 300 including the traveling direction image, the PV image, and the second registration SW image included in the second display command. Even when the second registration SW image is touched, the display device 30 does not transmit the touch information to the PVMECU 20.

Since the registration SW image 306 is also displayed on the front mode screen 300 along with the traveling direction image and the PV image, it becomes easy for the driver to register the current position of the vehicle VA as the registration position.

Furthermore, when the vehicle speed Vs is larger than the second threshold value vehicle speed Vsth2, even if the registration SW image 306 is touched, the CPU does not deem that the registration operation of the registration position has been performed. On the other hand, when the vehicle speed Vs is less than or equal to the second threshold value vehicle speed Vsth2, when the registration SW image 306 is touched, the CPU deems that a registration operation has been performed. Thereby, when the vehicle VA is traveling at the vehicle speed Vs larger than the second threshold value vehicle speed Vsth2, the possibility that the driver tries to touch operate the registration SW image and performs sideways driving can be reduced.

Registration Position Information Registration Routine

Figure 7:
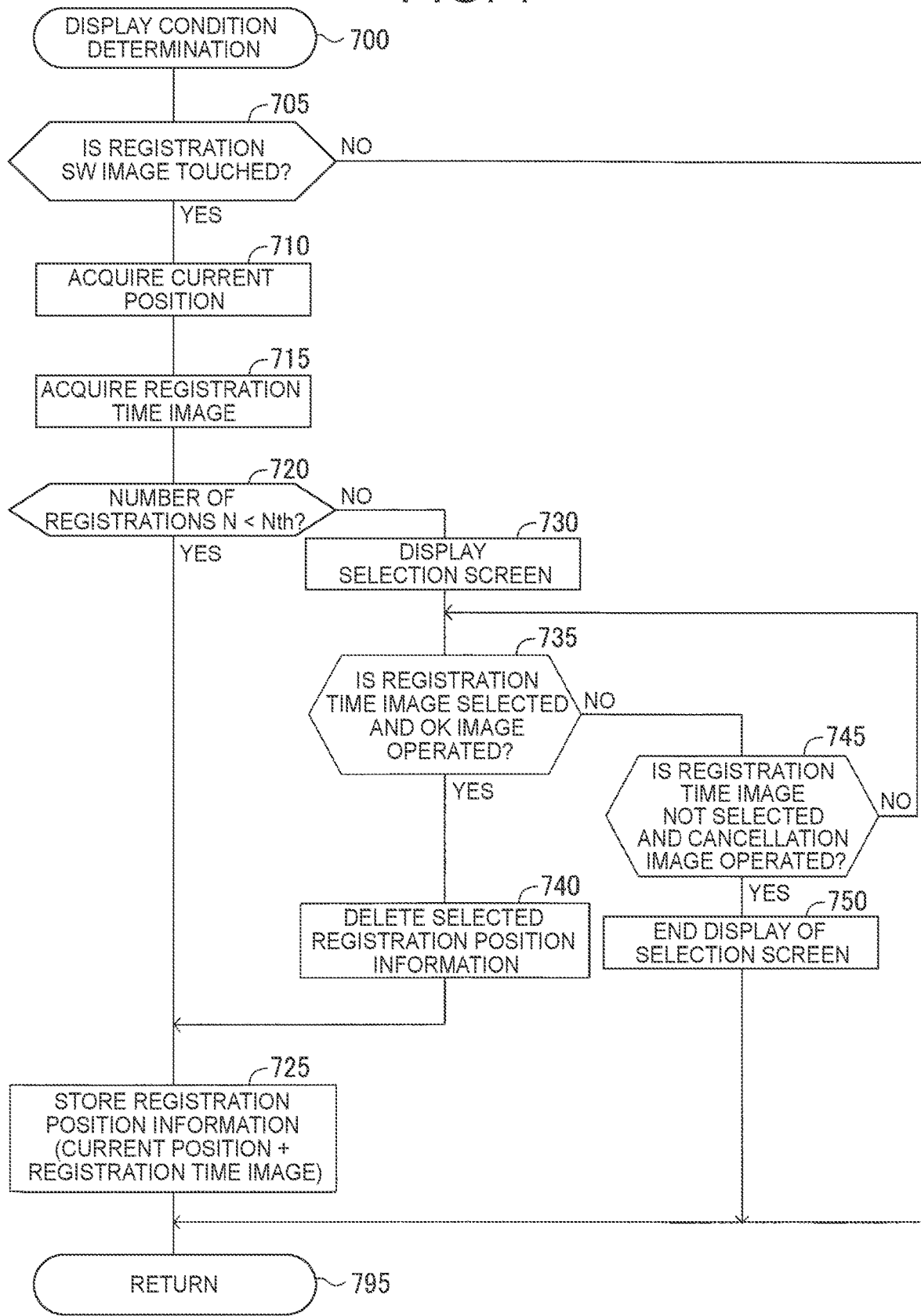
FIG. 7 shows a flowchart of a registration position information registration routine executed by the PVMECU CPU shown in FIG. 1.

The CPU executes the registration position information registration routine shown by flowchart in FIG. 7 every time a predetermined time elapses.

Therefore, at a predetermined timing, the CPU starts the process from step 700 shown in FIG. 7 and proceeds to step 705. In step 705, the CPU determines whether the touch information has been received (that is, whether the registration SW image 306 has been touched).

When the registration SW image 306 is not touched, the CPU determines "No" in step 705, and proceeds to step 795 to temporarily end this routine.

When the registration SW image 306 is touched, the CPU determines "Yes" in step 705 and executes steps 710 to 720 in order.

Step 710: The CPU acquires the current position of the vehicle VA based on the positioning signals received by the GNSS receiver 25.

Step 715: The CPU generates the PV image based on the front image, the rear image, the left side image and the right side image, that are acquired from each of the cameras 22FR to 22R and generates the traveling direction image based on the front image, and acquires the traveling direction image and the PV image as the registration time image.

Step 720: The CPU determines whether the number of registration position information (number of registrations) N stored in the position information at the time of registration is less than the threshold value Nth.

Step 725: The CPU stores in the registration position information storage unit 312, the registration position information in which the current position of the vehicle VA and the registration time image are associated, and stores the registration time image in the image storage unit 310.

After that, the CPU proceeds to step 795 and temporarily ends this routine.

On the other hand, when the number of registrations N is the threshold value Nth or more when the CPU advances to step 720, the CPU determines "No" in step 720 and executes step 730 and step 735 in order.

Step 730: The CPU displays the selection screen 320 on the display device 30.

Step 735: The CPU determines whether the OK image 326 is touched with at least one registration time image selected on the selection screen 320.

When the OK image 326 is touched with at least one registration time image selected, the CPU determines "Yes" in step 735 and proceeds to step 740. In step 740, the CPU deletes the registration position information of the selected registration time image from the registration position information storage unit 312 and deletes the registration time image from the image storage unit 310. Thereafter, the CPU proceeds to step 725 to newly store the registration position information, and proceeds to step 795 to temporarily end this routine.

When the OK image 326 is not touched when the CPU proceeds to step 735, the CPU determines "No" in step 735 and proceeds to step 745. In step 745, the CPU determines whether the cancellation image 328 is touched while the registration time image is not selected on the selection screen 320.

When the cancellation image 328 is not touched, the CPU determines "No" in step 745 and returns to step 735.

When the cancellation image 328 is touched with at least one registration time image selected, the CPU determines "Yes" in step 745 and proceeds to step 750. In step 750, the CPU ends the display of the selection screen 320 and displays the front mode screen 300. After that, the CPU proceeds to step 795 and temporarily ends this routine.

Display End Condition Determination Routine

Figure 8:
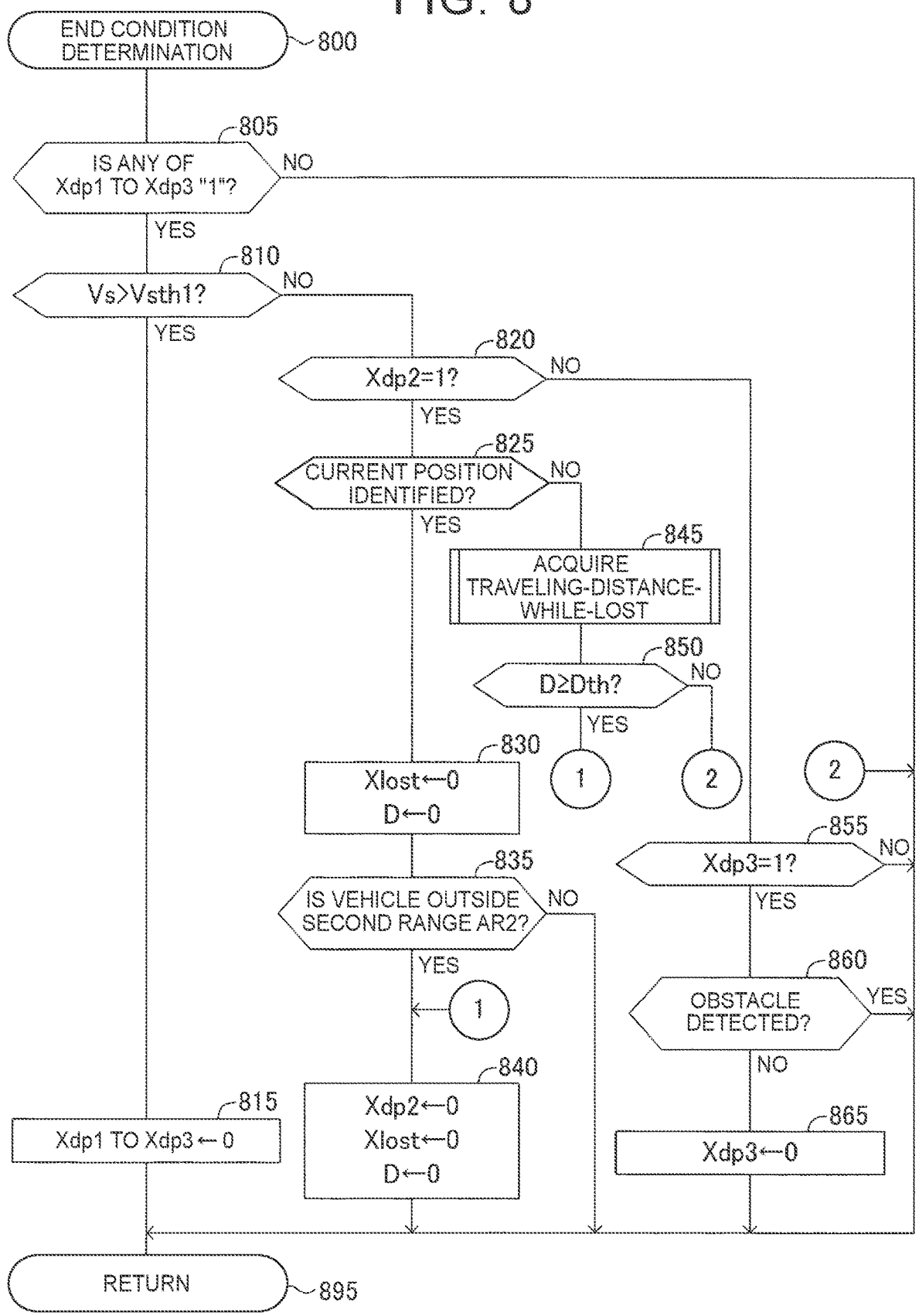
FIG. 8 shows a flowchart of an end condition determination routine executed by the PVMECU CPU shown in FIG. 1.

The CPU executes an end condition determination routine shown by the flowchart in FIG. 8 every time a predetermined time elapses.

Therefore, at a predetermined timing, the CPU starts the process from step 800 shown in FIG. 8 and proceeds to step 805. In step 805, the CPU determines whether values of a first display flag Xdp1, a second display flag Xdp2, and a third display flag Xdp3 are "1".

When the values of the first display flag Xdp1, the second display flag Xdp2, and the third display flag Xdp3 are all "0", the CPU determines "No" in step 805, and the procedure proceeds to step 895 and temporarily ends this routine.

When the values of the first display flag Xdp1, the second display flag Xdp2, and the third display flag Xdp3 are "1", the CPU determines "Yes" in step 805 and proceeds to step 810. In step 810, the CPU determines whether the vehicle speed Vs is greater than the first threshold value vehicle speed Vsth1.

When the vehicle speed Vs is greater than the first threshold value vehicle speed Vsth1, the CPU determines "Yes" in step 810 and proceeds to step 815. In step 815, the CPU sets the values of the first display flag Xdp1, the second display flag Xdp2, and the third display flag Xdp3 to "0". After that, the CPU proceeds to step 895 and temporarily ends this routine.

When the vehicle speed Vs is equal to or less than the first threshold value vehicle speed Vsth1, the CPU determines "No" in step 810 and proceeds to step 820. In step 820, the CPU determines whether the value of the second display flag Xdp2 is "1".

When the value of the second display flag Xdp2 is "1", the CPU determines "Yes" in step 820 and proceeds to step 825. In step 825, the CPU determines whether the current position of the vehicle VA can be specified (that is, whether the GNSS receiver 25 is receiving positioning signals).

When the current position of the vehicle VA can be specified (that is, when the GNSS receiver 25 is receiving the positioning signals), the CPU determines "Yes" in step 825, and step 830 and step 835 are executed in order.

Step 830: The CPU sets the value of a lost flag Xlost to "0" and sets a traveling-distance-while-lost D to "0" during the loss.

The value of the lost flag Xlost is set to "1" when the current position of the vehicle VA cannot be determined, and is set to "0" when the current position of the vehicle VA can be determined. The CPU sets the value of the lost flag Xlost to "0" in the initial routine.

The traveling-distance-while-lost D is the distance traveled by vehicle VA while the current position of vehicle VA cannot be identified.

Step 835: The CPU determines whether the vehicle VA is positioned outside the second range AR2. The second range AR2 is a range centered on the registration position used for establishing the position condition when the value of the second display flag Xdp2 is set to "1".

When the vehicle VA is positioned outside the second range AR2, the CPU determines "Yes" in step 835 and proceeds to step 840. In step 840, the CPU sets the values of the second display flag Xdp2 and the lost flag Xlost to "0"

and sets the traveling-distance-while-lost D to "0". After that, the CPU proceeds to step 895 and temporarily ends this routine.

When the vehicle VA is not located outside the second range AR2 (that is, when the vehicle VA is positioned in the second range AR2), the CPU determines "No" in step 835 and proceeds to step 895 to temporarily end this routine.

On the other hand, when the current position of the vehicle VA cannot be specified when the CPU proceeds to step 825 (that is, when the GNSS receiver 25 is not receiving the positioning signals), the CPU determines "No" in step 825 and executes step 845 and step 850 in order.

Step 845: The CPU executes a traveling-distance-while-lost acquisition subroutine.

Figure 9:
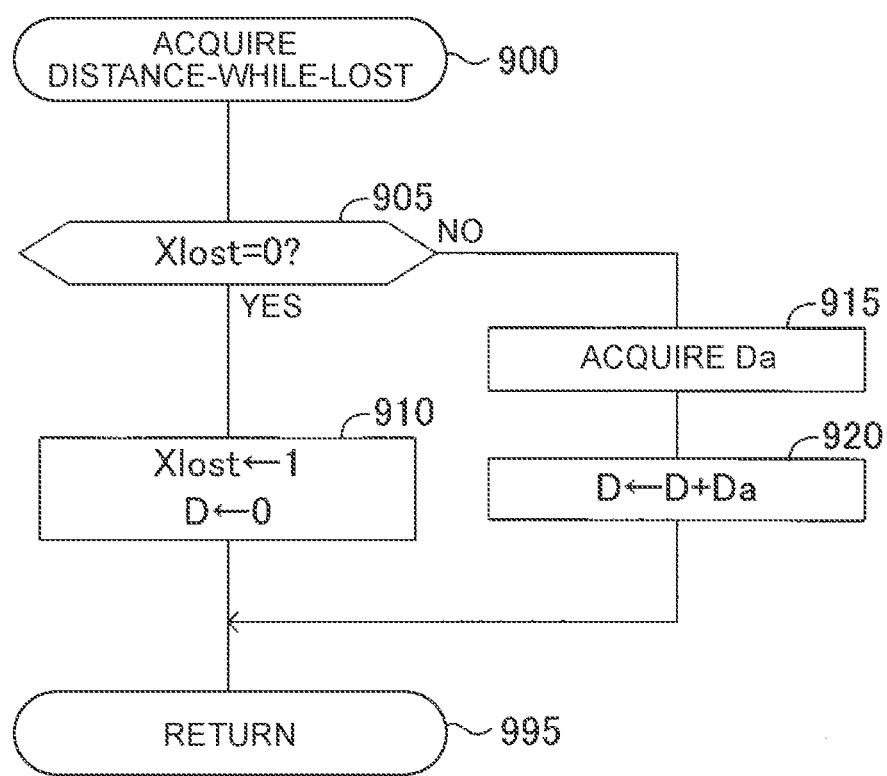
FIG. 9 is a flowchart of a distance-while-lost acquisition subroutine executed by the PVMECU CPU shown in FIG. 1.

Actually, when the CPU proceeds to step 845, the CPU executes the subroutine shown by the flowchart in FIG. 9. In this subroutine, the CPU acquires the traveling-distance-while-lost D.

Step 850: The CPU determines whether the traveling-distance-while-lost D is the threshold value distance Dth or more.

When the traveling-distance-while-lost D is the threshold value distance Dth or more, the CPU determines "Yes" in step 850, proceeds to step 840, and sets the value of the second display flag Xdp2 to "0". After that, the CPU proceeds to step 895 and temporarily ends this routine.

When the traveling-distance-while-lost D is less than the threshold value distance Dth, the CPU determines "No" in step 850 and proceeds to step 895 to end this routine once.

On the other hand, when the value of the second display flag Xdp2 is "0" when the CPU proceeds to step 820, the CPU determines "No" in step 820 and proceeds to step 855.

In step 855, the CPU determines whether the value of the third display flag Xdp3 is "1".

When the value of the third display flag Xdp3 is "1", the CPU determines "Yes" in step 855 and proceeds to step 860. At step 860, the CPU determines whether at least one of the front sonar 23FR and the rear sonar 23RR detects an obstacle.

When at least one of the front sonar 23FR and the rear sonar 23RR detects an obstacle, the CPU determines "Yes" in step 860 and proceeds to step 895 to temporarily ends this routine.

When neither the front sonar 23FR nor the rear sonar 23RR detects an obstacle, the CPU determines "No" in step 860 and proceeds to step 865. In step 865, the CPU sets the value of the third display flag Xdp3 to "0". After that, the CPU proceeds to step 895 and temporarily ends this routine.

On the other hand, when the value of the third display flag Xdp3 is "0" when the CPU proceeds to step 855, the CPU determines "No" in step 855, proceeds to step 895, and temporarily ends this routine.

Distance-while-Lost Acquiring Subroutine

When the CPU proceeds to step 845 shown in FIG. 8, processing starts from step 900 shown in FIG. 9 and proceeds to step 905. In step 905, the CPU determines whether that the value of the lost flag Xlost is "0".

When the value of the lost flag Xlost is "0", the CPU determines "Yes" in step 905 and proceeds to step 910. Step 910: The CPU sets the value of the lost flag Xlost to "1" and sets the traveling-distance-while-lost D to "0". After that, the CPU proceeds to step 995, temporarily ends this routine, and proceeds to step 850 shown in FIG. 8.

On the other hand, when the value of the lost flag Xlost is "1", the CPU determines "No" in step 905, and executes steps 915 to 920 in order.

Step 915: The CPU acquires the traveling distance Da of the vehicle VA in a period based on the number of wheel pulse signals generated by the wheel speed sensor 21 in the period from the previous execution of the end condition determination routine shown in FIG. 8 to the present time.

Step 920: The CPU adds the traveling distance Da to the traveling-distance-while-lost D.

After that, the CPU proceeds to step 995, temporarily ends this routine, and proceeds to step 850 shown in FIG. 8.

As described above, when the delete condition that the number of registrations N is equal to or greater than the threshold value Nth is established, the peripheral monitoring device 10 displays the "selection screen 320 including the registration time image of the registration position information stored in the registration position information storage unit 312". The peripheral monitoring device 10 deletes from the registration position information storage unit 312, the registration position information corresponding to the registration time image selected on the selection screen 320.

Thereby, the driver makes it easy to identify which position the registration position information is at by visually viewing the selection screen 320. Therefore, the driver can accurately select the unnecessary registration position information to be deleted. Furthermore, the peripheral monitoring device 10 can be applied to the vehicle VA that does not have map data.

Furthermore, when the vehicle VA becomes located outside the second range AR2 that is wider than the first range AR1 centered on the registration position, the peripheral monitoring device 10 ends the display of the front mode screen 300. Thereby, the possibility that the display of the front mode screen 300 starts and ends is repeated can be reduced.

Furthermore, when the current position of the vehicle VA cannot be specified (that is, when the positioning signals cannot be received), when the traveling distance (traveling-distance-while-lost) D of the vehicle VA from that time becomes the threshold value distance Dth or more, the peripheral monitoring device 10 ends the display of the front mode screen 300. For example, when the vehicle VA is positioned in an underground parking lot or the like, there is a case in which the current position of the vehicle VA can not be specified. Even in such a case, the display of the front mode screen 300 can be appropriately ended.

The present disclosure is not limited to the above embodiment, and various modifications can be adopted within the scope of the present disclosure.

First Modification

The front mode screen 300 should include at least one of the traveling direction image and the PV image. Similarly, the registration time image should include at least one of the traveling direction image and the PV image.

Second Modification

The display device 30 displays a delete switch (SW) image not shown. The delete SW image is touched when the driver wishes to delete the registration position information. In a case in which the delete SW image is touched, when the number of registrations N is equal to or more than the threshold value Nth the PVMECU 20 may establish the delete condition and display the selection screen 320. As a result, by touching the delete SW image, the driver can select the registration position information to be deleted.

Third Modification

The first range AR1 and the second range AR2 may have a shape other than a circular shape if the second range AR2 is wider than the first range AR1 centered on the registration position.

Fourth Modification

When the peripheral monitoring device 10 can recognize obstacles around the vehicle VA based on the images taken by the cameras 22FR to 22R, the peripheral monitoring device 10 does not need to include the front sonar 23FR and the rear sonar 23RR.

The front sonar 23FR and the rear sonar 23RR may be remote sensing devices that can transmit a wireless medium other than sound waves and detect objects by receiving the reflected wireless media. Furthermore, the number of front sonar 23FR and rear sonar 23RR is not limited to four, respectively.

The number of cameras 22FR to 22R is not limited to four as long as the cameras 22FR to 22R can capture images of the area (peripheral area) around the vehicle VA (360 degrees).

Fifth Modification

When the PVMECU 20 according to the fifth modification displays the front mode screen 300, the registration SW image 306 is displayed when the vehicle speed Vs is equal to or less than the second threshold value vehicle speed Vsth2, and the registration SW image 306 is not displayed when the vehicle speed Vs is greater than the second threshold value vehicle speed Vsth2.

Sixth Modification

The PVMECU 20 according to the sixth modification displays the registration SW image 306 on the front mode screen 300 regardless of the magnitude relationship between the vehicle speed Vs and the second threshold value vehicle speed Vsth2. However, the PVMECU 20 determines whether the registration SW image 306 is touched only when the vehicle speed Vs is the second threshold value vehicle speed Vsth2 or less. When the registration SW image 306 is touched, the process after step 710 shown in FIG. 7 is executed.

Seventh Modification

In the above-described embodiment, when the shift position SP is a position other than the parking (P) position and the reverse (R) position, the PVMECU 20 displays the front mode screen 300 including the traveling direction image generated based on the front image of the traveling direction of the vehicle VA. However, when the shift position SP is a reverse (R) position, the PVMECU 20 may display the rear mode screen including the traveling direction image generated based on the rear image of the traveling direction of the vehicle VA. The rear mode screen has the same configuration as the front mode screen 300 except that the traveling direction image is an image generated based on the rear direction image. cl Eighth Modification The peripheral monitoring device 10 is used also for a hybrid electric vehicle (HEV), a plug-in hybrid electric vehicle (PHEV), a fuel cell electric vehicle (FCEV), and a battery electric vehicle (BEV), in addition to the engine vehicle described above.

What is claimed is:

1. A peripheral monitoring device comprising:
an image capturing device configured to capture an image of a peripheral area of a vehicle; and
a processor configured to
determine whether a predetermined display condition has been established,
acquire the image from the image capturing device in response to determining the predetermined display condition has been established,
generate a predetermined peripheral image based on the captured image of the peripheral area,
display a periphery image screen on a display device mounted on the vehicle, the periphery image screen including the generated predetermined peripheral image;
determine whether a driver of the vehicle has performed a registration operation to register a current position of the vehicle as a registered position,
acquire the current position in response to determining that the driver has performed the registration operation,
acquire the generated predetermined peripheral image at the acquired current position of the vehicle as a registration time image,
store the current position associated with the registration time image as registration position information,
wherein the processor is further configured to
determine whether a position condition is established, the position condition being a condition that the vehicle is positioned within a predetermined first range centered on the registered position,
display the periphery image screen on the display device in response to the position condition being established,
determine whether a number of pieces of the stored registration position information is equal to or more than a predetermined threshold value,
display on the display device, a selection screen including a stored registration time image of the registration position information in response to the number of pieces of the stored registration position information being equal to or more than a predetermined threshold value,
determine whether the driver selected the registration time image on the selection screen, and
delete registration position information of the selected registration time image.

2. The peripheral monitoring device according to claim 1, wherein the processor is configured to
determine whether the vehicle is positioned outside a second range set to a range wider than the first range centered on the registered position, in a case in which the periphery image screen is displayed on the display device in response to determining that the position condition is established
end display of the periphery image screen in response to determining that the vehicle is positioned outside the second range.

3. The peripheral monitoring device according to claim 1, wherein the processor is configured to
identify the current position of the vehicle based on a positioning signal received from a plurality of artificial positioning satellites, and
determine whether a traveling distance in which the vehicle has traveled from a time point at which the current position of the vehicle is not able to be identified is equal to or more than a predetermined threshold value distance, in a case in which the current position of the vehicle is not able to be identified while the periphery image screen is displayed on the display device in response to the position condition being established,
end display of the periphery image screen in response to determining that the traveling distance in which the vehicle has traveled from the time point at which the current position of the vehicle is not able to be identified is equal to or more than a predetermined threshold distance.

4. The peripheral monitoring device according to claim 1, wherein the processor is configured to acquire as the predetermined peripheral image, at least one of an image of a traveling direction of the vehicle and an overhead view image of the peripheral area of the vehicle, and display on the display device, the periphery image screen that includes the predetermined peripheral image and the selection screen.

5. The peripheral monitoring device according to claim 1, wherein the processor is configured to determine whether either an operation condition that the driver performs a request operation requesting display of the periphery image screen or an obstacle condition that an obstacle is detected in a vicinity of the vehicle is established, display the periphery image screen on the display device in response to determining that either the operation condition or the obstacle condition is established.

6. The peripheral monitoring device according to claim 5, wherein the display device is a touch screen style display device, and wherein the processor is configured to display a registration switch image on the display device together with the predetermined peripheral image in a case in which the periphery image screen is displayed on the display device, determine whether the driver touches the registration switch image, determine that the driver has performed the registration operation in response to determining that the driver touches the registration switch image, acquire the registration time image, and store the registration position information, in response to determining that the driver has performed the registration operation.

7. The peripheral monitoring device according to claim 6, wherein the processor is configured to determine whether a vehicle speed that is a speed of the vehicle is equal to or less than a predetermined threshold value vehicle speed, or is greater than the threshold value vehicle speed, determine that the driver has performed the registration operation in response to determining that the driver touches the registration switch image in a case in which the vehicle speed is equal to or less than the predetermined threshold value vehicle speed, and determine that the driver has not performed the registration operation in response to determining that the driver touches the registration switch image in a case in which the vehicle speed is greater than the threshold value vehicle speed.

8. The peripheral monitoring device according to claim 3, wherein the processor is configured to determine that the current position of the vehicle becomes unidentifiable in response to the positioning signal not being able to be received.

\* \* \* \* \*